Oct. 18, 1960     W. O. NELSON     2,956,443

AUTOMATIC VARIABLE SPEED TRANSMISSION

Filed March 17, 1959     9 Sheets-Sheet 1

William O. Nelson

INVENTOR.

Oct. 18, 1960 W. O. NELSON 2,956,443
AUTOMATIC VARIABLE SPEED TRANSMISSION
Filed March 17, 1959 9 Sheets-Sheet 2

William O. Nelson
INVENTOR.

William O. Nelson
INVENTOR.

Oct. 18, 1960 W. O. NELSON 2,956,443
AUTOMATIC VARIABLE SPEED TRANSMISSION
Filed March 17, 1959 9 Sheets-Sheet 4

William O. Nelson
INVENTOR.

Oct. 18, 1960     W. O. NELSON     2,956,443
AUTOMATIC VARIABLE SPEED TRANSMISSION
Filed March 17, 1959     9 Sheets-Sheet 6

William O. Nelson
INVENTOR.

Oct. 18, 1960 W. O. NELSON 2,956,443
AUTOMATIC VARIABLE SPEED TRANSMISSION
Filed March 17, 1959 9 Sheets-Sheet 8

William O. Nelson
INVENTOR.

BY Clarence A. O'Brien
and Harvey B. Jacobson
Attorneys

Oct. 18, 1960  W. O. NELSON  2,956,443
AUTOMATIC VARIABLE SPEED TRANSMISSION
Filed March 17, 1959  9 Sheets-Sheet 9

William O. Nelson
INVENTOR.

BY Clarence A O'Brien
and Harvey B. Jacobson
Attorneys

United States Patent Office 2,956,443
Patented Oct. 18, 1960

2,956,443

AUTOMATIC VARIABLE SPEED TRANSMISSION

William O. Nelson, 1864 Grove St., Sarasota, Fla.

Filed Mar. 17, 1959, Ser. No. 799,968

14 Claims. (Cl. 74—336.5)

This invention comprises a novel and useful automatic variable speed transmission and more particularly relates to an antomatic transmission which is shiftable to both higher and lower gear ratios in response to speed variations and is of a compact size especially adapted for use as a bicycle or similar transmission.

The basic and primary purpose of this invention is to provide an automatic transmission capable of handling relatively light loads such as those presented in bicycles, motorcycles, or other light weight power operated devices and which will automatically shift the gears of the transmission to either a higher or a lower gear ratio in response to changes in speed of the driven element.

A further object of the invention is to provide a transmission in accordance with the foregoing object which shall be of such compact size and so arranged that the same may be readily disposed in the crank arm hanger of or in the wheel hub of bicycles, and shall be peculiarly adapted for use with bicycles.

A further important object of the invention is to provide an automatic transmission in accordance with the preceding objects which shall have a readily accessible and convenient means for varying the range of speed at which the automatic transmission operates.

A further object of the invention is to provide an automatic transmission in accordance with the above mentioned objects which shall include a manual control means of simple construction for positively locking the transmission in a selected gear ratio.

Still another object of the invention is to provide an automatic transmission wherein a speed responsive means operates to place the transmission in a selected gear ratio, together with means preventing such operation until the difference in the torque of the driving and driven members of the transmission is substantially zero.

Yet another object is to provide a transmission in accordance with any of the preceding objects which shall be capable of use with a coaster brake of a bicycle whereby to obtain the advantages of an automatic variable gear ratio transmission while retaining the function of a conventional coaster brake.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Illustrated in the accompanying drawings and described hereinafter is an automatic speed actuated transmission in accordance with this invention which is especially adapted for use with bicycles. It is to be understood, however, that although the invention is specifically adapted for this particular use, it possesses varying utility as a speed responsive automatic transmission for other uses, as for example with motorcycles, or other relatively light weight power operated vehicles and implements. Consequently, it is not desired to limit the invention to the particular use illustrated in the drawings, which are by way of illustrating the principles of the invention only, except as necessitated in the claims appended hereto.

Figure 1:
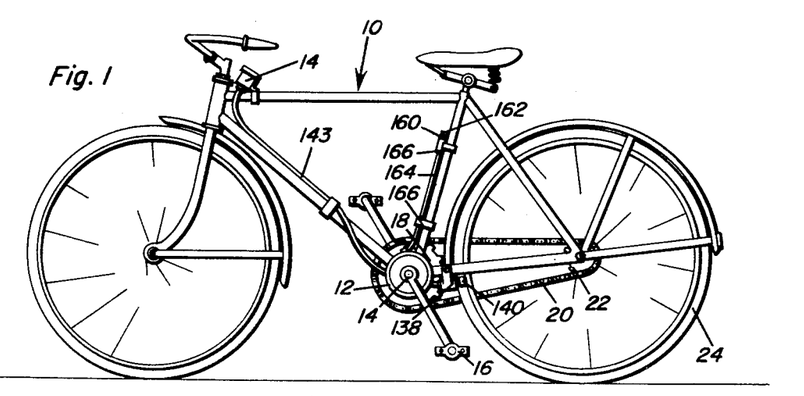
Figure 1 is a side elevational view showing a bicycle in which the automatic transmission of this invention and its associated attachments have been incorporated with the axle hanger.

Referring first to Figure 1, there is shown the frame of a bicycle or similar vehicle designated generally by the numeral 10 and which has the usual hanger 12 in which is mounted a crankshaft 14 having crank pedals 16 thereon, the crankshaft having a sprocket gear 18 which by means of a sprocket chain 20 operates a driven sprocket 22 secured to a rear wheel 24 of the bicycle. In accordance with this invention, there is provided an automatic speed responsive transmission which is compactly housed in the hanger 12 and is operatively connected to the pedal actuated crankshaft 14 and the driving sprocket 18 whereby selected different speed ratios may be provided between the crankshaft 14 and the sprocket 18.

Figure 2:
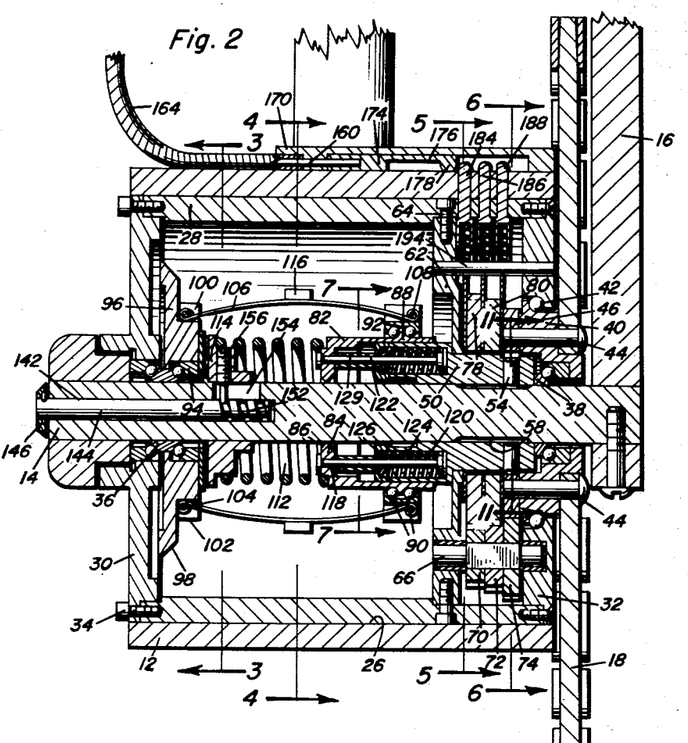
Figure 2 is a fragmentary view in vertical central section through a portion of the frame construction and crank axle hanger of a bicycle and the automatic transmission assembly housed therein the transmission being shown in its position of direct drive between the crank axle and the sprocket drive wheel of the bicycle.

Referring next to Figure 2, it will be seen that the hanger 12 has a cylindrical bore 26 therethrough in which is received the cylindrical housing or casing 28 of the automatic transmission assembly in accordance with this invention. The casing 28 is provided with a pair of head or end plates 30 and 32, extending into the inside of the casing and detachably secured thereto by means of fastening screws 34. Disposed in an axial bore in the end wall 30 is a bearing assembly 36 in which is journaled one end of the crankshaft 14, previously mentioned. The other end of the shaft 14 is journaled by a bearing assembly 38 in a housing or body 40 which in turn is journaled as by bearings 42 in the end wall 32. The hub of the sprocket gear 18 is mounted upon the body 40, being fixedly secured thereto as by a plurality of pins 44.

The inward extremities of the pins 44 in turn rigidly support a ring gear 46 which constitutes a part of the transmission gearing which is operatively interposed between the sprocket gear 18, constituting the driving gear thereof, and the crankshaft axle 14 and is journaled upon a sleeve 50.

Figures 5, 11, 13:
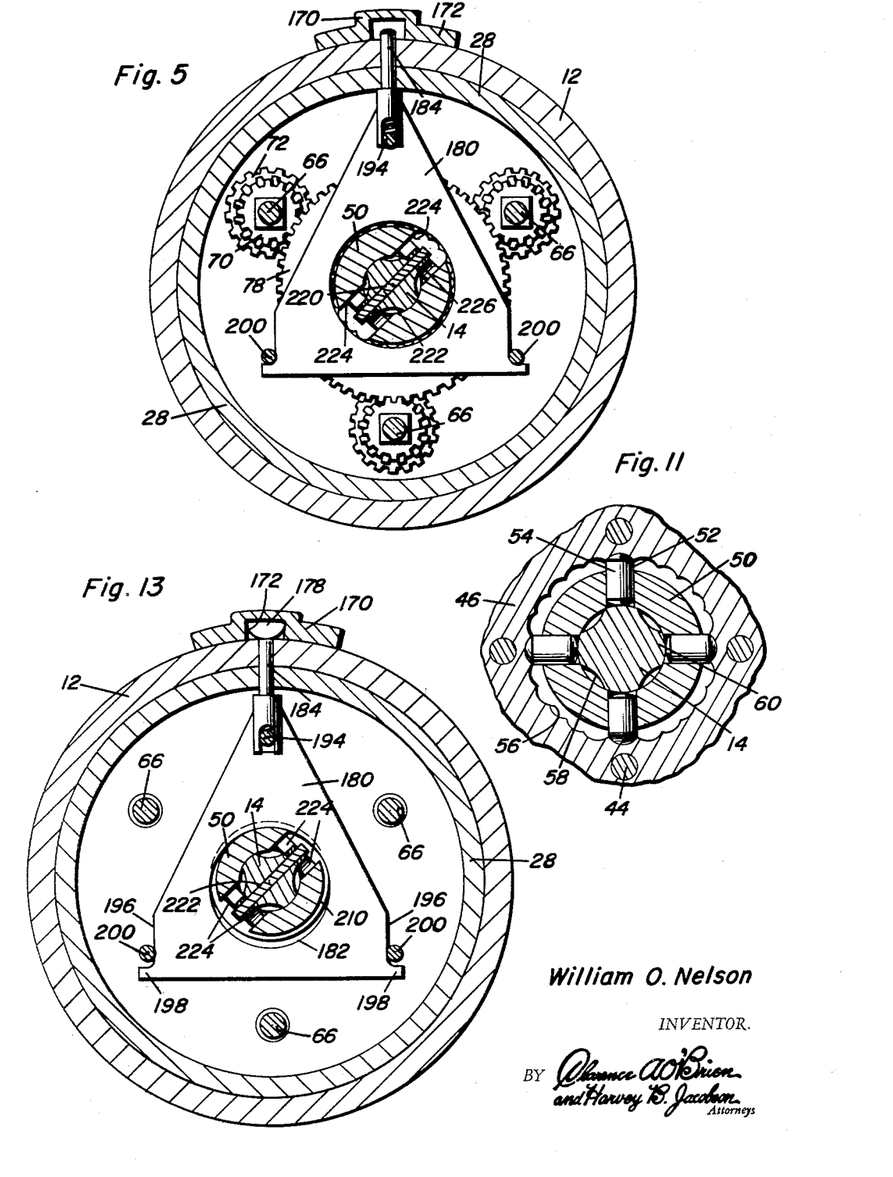
Figure 5 is a vertical transverse sectional view taken substantially upon the plane indicated by the section line 5—5 of Figure 2 and showing in particular certain details of the manually operated means for locking the transmission in a set gear ratio.
Figure 11 is a vertical transverse sectional detail view taken upon an enlarged scale substantially upon the plane indicated by the section line 11—11 of Figure 2 and showing the cam actuating means for retaining the transmission in a selected gear ratio.
Figure 13 is an enlarged view in vertical transverse section taken substantially upon the plane indicated by the section line 13—13 of Figure 12 and showing the locking means which is manually operated for retaining the transmission in its high speed gear ratio.

Slidably and oscillatably received upon the crankshaft or axle 14 is the sleeve 50, see in particular Figure 11, which is the selector or shifter sleeve for the transmission, having a plurality of radially disposed bores 52 therein in which are slidably received pins 54. The ring gear 46 has an inner surface which is provided with a plurality of circumferentially spaced recesses or notches 56 each of which is capable of selectively receiving one of the pins 54 when the latter are regularly advanced from their bores 52.

Figure 6:
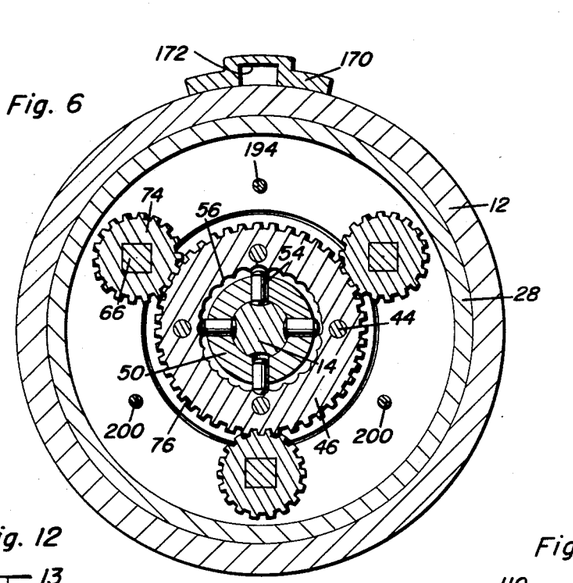
Figure 6 is a vertical transverse sectional view taken substantially upon the plane indicated by the section line 6—6 of Figure 2 and showing the gear train by which a direct drive is established between the crank axle and the sprocket driving wheel when the transmission is in direct drive as shown in Figure 2.
Figure 7:
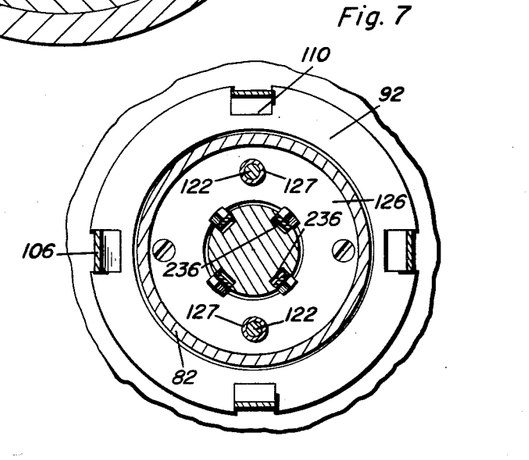
Figure 7 is a vertical transverse sectional view taken substantially upon the plane indicated by the section line 7—7 of Figure 2 and upon an enlarged scale and showing certain details of the gear shifting mechanism of the transmission.

The exterior surface of the crankshaft 14 is provided with longitudinally extending recesses 58 therein, there being thus provided radially extending portions 60 of the shaft which together with the recesses comprise a series of circumferentially spaced cams. The arrangement is such that when the recesses 58 are disposed beneath the pins 54, the latter may be retracted inwardly so that their outer ends will clear the recesses 56 as shown in Figure 6; while when the portions 60 of the shaft lie beneath the pins 54 the latter will be projected outwardly and into engagement with these recesses as shown in Figure 11. When the cam portions of the shaft are disposed beneath the pins, the latter will be locked in the recesses 56, acting as a clutch to thereby lock the shaft 14 to the gear 46, and since the latter is connected by the pins 44 directly to the sprocket 18, a direct drive will be established between the axle or crankshaft 14 which is pedal operated and constitutes the driving shaft and the gear 46, carrier member 40 and the sprocket 18 which latter thus constitutes the driven shaft of the transmission.

Referring again primarily to Figure 2 it will be seen that there is provided a partition 62 within the casing 28 adjacent the end wall 32 thereof, which partition is releasably secured in place as by fastening screws 64. The partition 62 together with the end wall 32 serve to journal the axles 66 of the plurality of compound or triple gears, see Figures 5 and 6, which are rigidly secured to each other and to their axle. The compound gears comprise gears 70, 72 and 74, the latter engaging the external gear teeth 76 upon the ring gear 46 previously mentioned, as shown best in Figure 6.

Likewise freely rotatably received upon the exterior surface of the sleeve 50 in the same manner as the previously mentioned gear 46 is a pair of externally toothed ring gears 78 and 80 which respectively mesh with the triple gear 70 and 72 and respectively constitute the intermediate and high speed drive gears for the sprocket 18. As is the case with the previously mentioned ring gear 46, the gears 78 and 80 are provided with the previously mentioned recesses or notches similar to those shown at 56 in Figure 11 for the gear 46, and which are adapted to receive in releasable locking engagement the clutch pins 54 as the latter are shifted axially of the shaft 14 by movement of the sleeve 50 by a mechanism to be subsequently set forth.

The arrangement is such that when the selector sleeve 50 is shifted to position the pins 54 carried thereby beneath either of the gears 78 or 80, and the cam surfaces 60 then projects the pins 54 outwardly into locking engagement with the respective gears, a different gear ratio drive is established between the shaft 14, the gear 78 or 80 clutched thereto, the gears 70 or 72 drivingly connected with the gear 78 or 80 and the gear 46 through the gear 74. In this manner either a direct drive or two different speed drives can be established between the driving shaft 14 and the driven shaft consisting of the hub of the sprocket gear 18, the member 40 and the gear 46 connected together as shown in Figure 2.

A speed control mechanism is provided for effecting the sliding movement of the gear shift or selector sleeve 50 in order to shift the clutch pins 54 for engagement with a selected gear train. This actuating means will be now described.

*Gear shift actuating mechanism for transmission*

Attention is now invited primarily to Figures 2, 8–10 and 16 wherein it will be observed that the selector or gear shifter sleeve 50 telescopingly receives for axial sliding movement thereon a control sleeve 82 having at its outer end an internal flange 84 with a knife edge 86 thereon. Upon the exterior surface of the control sleeve 82 there is provided a circumferentially extending rib or ridge 88 which is journalled as by a series of ball or other bearing elements 90 in an annular channel shaped yoke member 92. Thus, as axial movement is imparted to the yoke, it will in turn impart similar motion to the control sleeve 82 causing the latter to slide upon the shifter or clutch control sleeve 50.

Journaled upon a bearing assembly 94 which is mounted upon the shaft 14 adjacent the end wall 30 is a plate 96. This plate comprises a carrier for the speed control mechanism and has a beveled peripheral surface 98, see Figures 2, 16, for a purpose to be subsequently apparent and is provided with a plurality of radially inwardly extending notches 100 in a cylindrical portion 102 of the plate. Fastened in bores 103, Figure 16, in these notches as by suitable pins 104, see Figure 2, are the outer ends of a plurality of governor leaf springs 106. The other ends of these leaf springs are secured by similar pins 108 in bores 109, Figures 11, 16 in corresponding notches 110 provided in yoke member 92 which controls sliding movement of the sleeve 82 previously mentioned. A compression spring 112 surrounds the shaft 14, having its ends abutting against a spring retainer and adjusting collar 114 which slidably and rotatably is journaled upon the shaft 14 adjacent the member 96, the other end of the spring 112 engaging a shouldered seat 115 in the extremity of the flange 84 of the sleeve 82 previously mentioned. The spring 112 thus tends to urge the sleeve 82 towards the right as viewed in Figure 2, and it will be observed that the member 96 and the yoke 92 are freely rotatable in unison by the leaf springs 106. Usually these leaf springs will be found to be of sufficient strength to retain the members 96 and 92 in the desired rotationally fixed relation with respect to each other while allowing axial movement relative to each other. However, if desired, other guide means, not shown, could be provided to ensure this desired rotationally fixed position with respect to each other of these two elements.

At their midportions, the leaf springs 106 have weights 116 fixedly secured thereto in any desired manner. The arrangement is such that the weights will cause the springs 106 to flex or bend radially outwardly in response to increases in speed of rotation of this system, and this in turn will result in axial movement of the yoke 92 and therefore of the control sleeve 82 associated therewith.

Figure 4:
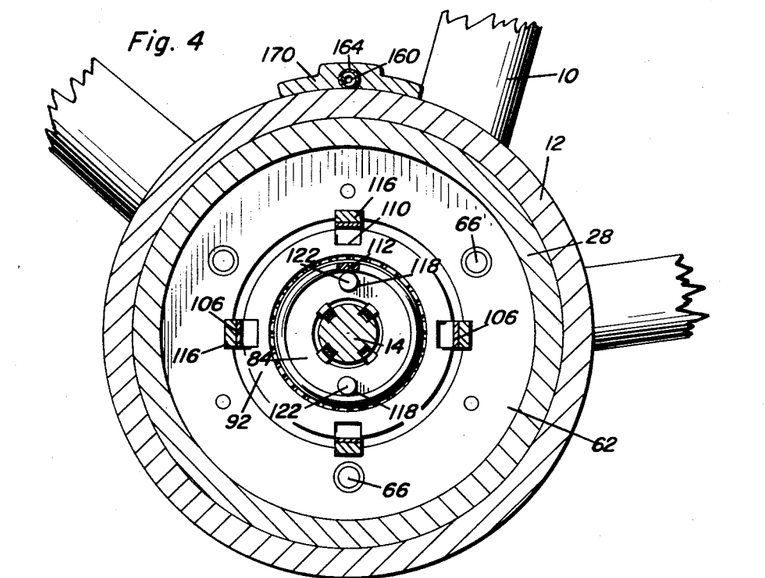
Figure 4 is a vertical transverse sectional view taken substantially upon the plane indicated by the section line 4—4 of Figure 2 and showing further details of the speed actuated control means for the transmission.
Figure 10:
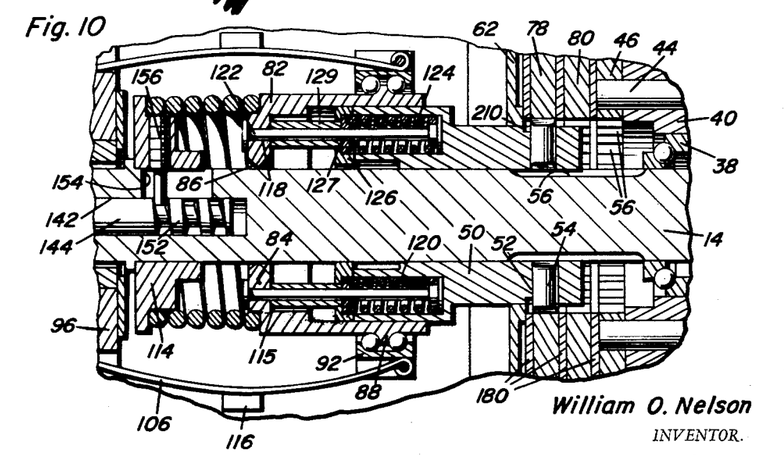

It will be observed from Figures 2, 4 and 10 that the flange 84 of the sleeve 82 is provided with a plurality of axially extending bores 118 with which are aligned further bores 120 formed in the adjacent end of the selector sleeve 50. Rods 122 having headed extremities are slidably received in the bores 118 and 120, and compression springs 124 surround the rods 122, abutting against the headed ends of the rods 122, and against a retaining ring 126.

The retainer ring 126 is detachably secured to the end of the selector sleeve 50 providing a closure for the open ends of the spring receiving bores 120 therein, and has apertures 127 registering with these bores, as seen best in Figures 7, 10, 16, 19–22.

A sleeve 129 slidably surrounds each rod 122 and upon the other side of the bore 127 in the retainer ring 126 abuts against a spring retainer washer 131 through which the rod 122 extends and which engages the end of the spring 124.

The sleeve 129 by abutting engagement with surface of the flange 84, the sleeve 82, as shown in Figures 2, 10, 21, 22 exerts force tending to compress or "cock" the springs 124 in readiness or preparation for the shifting of the transmission through the selector sleeve 50 to the right into its lower gear ratios. The rods 122, having their headed extremities engaging the flange 84 and the other ends of the springs 124 are compressively engaging the latter, as in Figures 2, 19, 20, in preparation for actuating the selector sleeve to the left into a higher gear ratio.

The arrangement is such that when the sleeve 82 is shifted to the left by the leaf springs 106 in response to a predetermined increase in speed, the rods 122 through their headed ends will compress the spring 124 thereby cocking the same and thus exert a force through the retaining means 126 upon the sleeve 50 which tends to urge the latter likewise towards the left and thus tends to move the clutch pins 54 to the same direction in the longitudinal clutch pin recesses 58 in the shaft 14. If there is no resistance to this axial shifting movement, the clutch pins will be selectively shifted between the gears 46, 80 or 78 in accordance with the position in which they are placed by the speed actuating mechanism, and thus place the transmission in the desired speed ratio.

Figure 3:
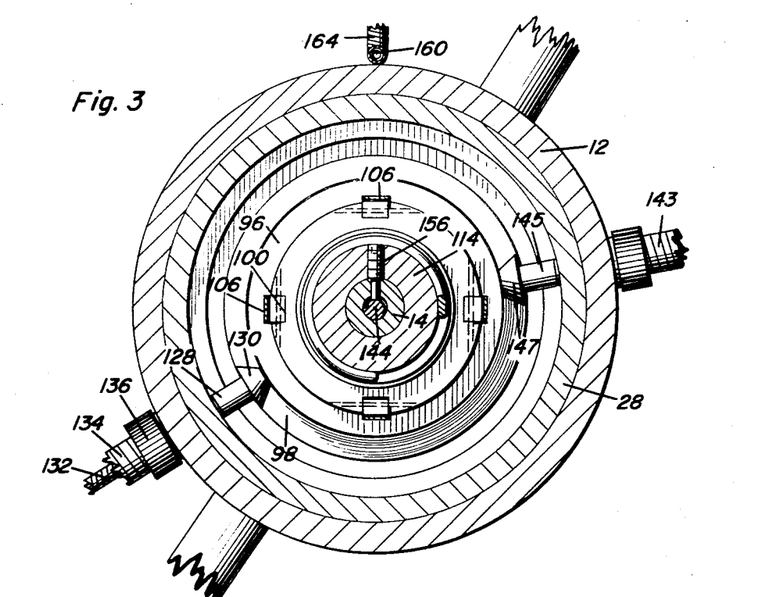
Figure 3 is a vertical transverse sectional view taken substantially upon the plane indicated by the section line 3—3 of Figure 2 and showing in particular certain details of the speed actuated control means for the transmission.

Referring now particularly to Figures 1, 2, 3, it will be observed that means are provided for connecting the member 96 by means of its tapered or beveled periphery 98 to a wheel 24 of the bicycle for causing the member 96 to rotate at a speed in proportion to the speed of travel of the vehicle. This means comprises a spindle 128 extending through the hanger 12 and casing 28 into the interior of the latter and having thereon a bevel friction wheel 130 which frictionally engages and meshes with the beveled periphery 98 of the member 96. The spindle 128 is connected to a flexible drive shaft 132 received in a flexible housing 134 which is coupled as by a connector 136 to the hanger 12. At its other end the housing 134 is clamped in a bracket 138 of any suitable character, which is mounted upon the frame 10 of the bicycle and the protruding end of the cable 132 is provided with a friction wheel 140 of any suitable character which engages the bicycle wheel 24. Thus, rotation of the bicycle wheel is used to produce rotation at a proportionate speed of the member 96 and thus cause the speed responsive mechanism previously described to shift the control sleeve 82 and thereby impart a predetermined tensioning to or "cocking" of the springs 124, the varied force of these springs being in turn employed to effect the sliding of the selector sleeve 50 and thereby cause the speed varying operation of this transmission. It will thus be seen that the shifting of the control sleeve 82 is directly proportional to the speed of the vehicle to which the transmission is attached and will vary as the speed of the driven shaft which is coupled to the transmission.

In a similar manner, see Figures 1 and 3, a speedometer 141 mounted on the bicycle frame 10 is connected through a flexible cable assembly 143 to a spindle 145 having a friction wheel 147 likewise engaging the beveled surface 98 of the governor plate 96.

*Mechanism for varying speed at which transmission operates*

Figure 14:
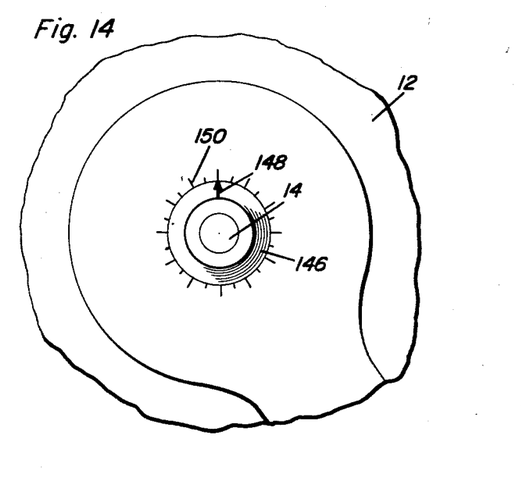
Figure 14 is a detail view in vertical elevation, upon an enlarged scale, of the crank axle hub of the bicycle and showing the adjusting means by which the range of actuation of the speed responsive control mechanism of the transmission is adjusted.
Figure 15:
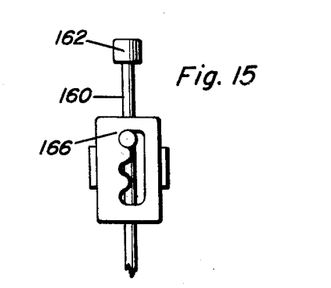
Figure 15 is a detail view of the control knob of the manual control means and the retention mechanism for holding the control knob in a selected position of adjustment.

Manual adjusting means are provided for regulating the degree of compression of the control sleeve spring 112 and thereby varying the speed range at which the speed responsive actuating mechanism is operable to change the speed ratio of this automatic transmission. Referring now to Figures 2, 3 and 10 it will be observed that the end of the shaft 14 is provided with an axial bore 142 therein in which there is received an adjusting shaft 144 having a calibrated control knob 146 on the outer end of the same. As shown best in Figure 14, this control knob is provided with a pointer or indicator 148 cooperating with indicia 150 provided upon the adjacent end of the shaft 14 whereby the range of adjustment for which the adjusting shaft 144 is set may be readily ascertained. At its inner extremity, the shaft 144 is provided with a screw thread 152 of relatively heavy pitch and a longitudinal slot 154 is formed in the shaft 14 in register with the thread 152.

The previously mentioned compression spring retainer 114 is slidable over this slot and has a threaded pin 156 extending through the retainer, through the slot and into engagement with the threads 152 as shown clearly in Figures 2 and 10. The arrangement is such that upon adjustment of the shaft 144 by the knob 146, the screw threads 152 will cause the pin 156 and therefore the retainer 114 to be adjusted axially of the shaft, thereby varying the compression of the spring 112 and thus the range of operation of the speed responsive mechanism.

*Manual control means for locking transmission in selected gear ratio*

The automatic transmision of this invention also includes a manual control means whereby the transmission may be manually locked in a selected gear ratio thereby preventing changing of the ratio by the speed responsive actuating mechanism. For a discussion and understanding of this mechanism attention is now directed primarily to Figures 1, 2, 5, 12, 13, 15 and 17. As shown in Figure 1 there is provided a suitable flexible control cable 160 having a push button headed extremity 162 which is operable within a flexible cable housing 164 clamped to a convenient portion of the bicycle frame 10 as by brackets 166.

As shown best in Figure 2, and also in Figure 4, the operating end of the control cable 160 is secured in a bore provided in the end of a housing 170 which is integrally formed with or rigidly attached to the exterior surface of the hanger 12 in a convenient position thereon. This housing has a longitudinally extending guide channel 172 therein whose side walls are preferably slightly convergent as shown in Figure 6 in order to slidably and guidingly retain therein a slide block 174 as shown in Figure 2. This block has a forwardly extending finger 176 with a downwardly projecting lug 178 as will be also apparent from Figure 12.

Figures 16, 17:
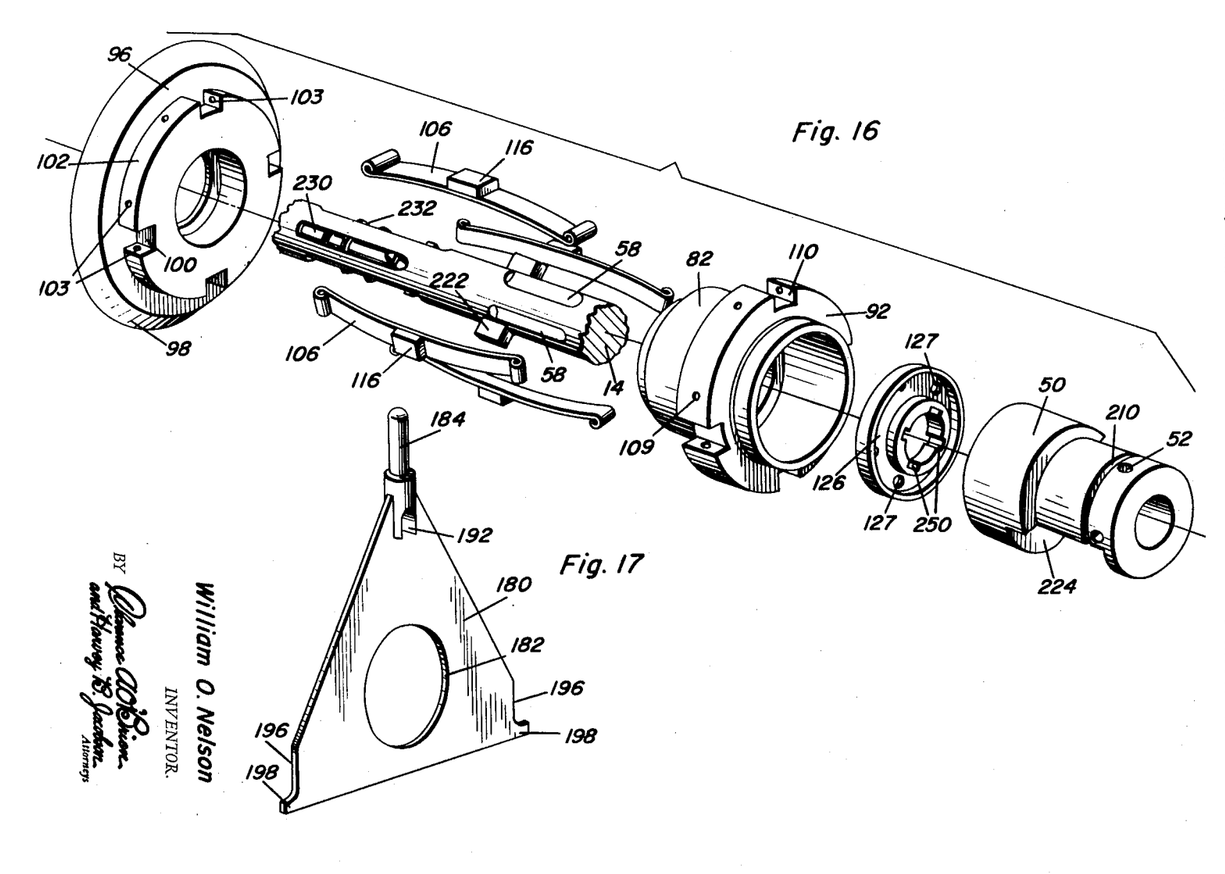
Figure 16 is an exploded perspective view of certain essential elements of the transmission.
Figure 17 is a perspective view of one of the latch plates of the manual control mechanics.

A plurality of triangular latch plates each designated by the numeral 180, see in particular Figures 5, 13, 17, are provided. Each latch plate is provided with a large opening 182 therein which loosely embraces the selector sleeve 50 for limited vertical movement relative thereto, and the latch plates are disposed between the partition 62 and the gear 78, between the gear 78 and the gear 80, and between the gear 80 and the gear 46. The latch plates thus also serve the function as spacers between the gears and the partition.

Figure 12:
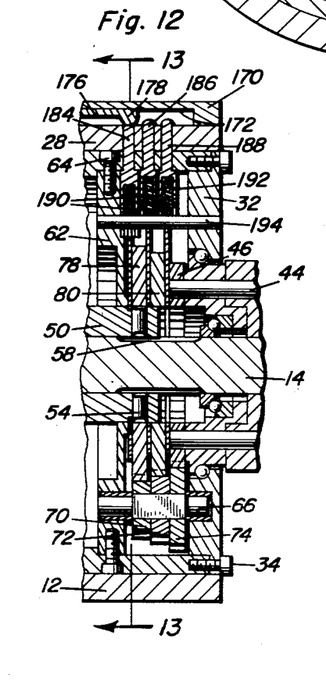
Figure 12 is a fragmentary detail view of a portion of the mechanism at the right hand of Figure 2 and showing the manner in which and the means by which the manually operated control, is operable to lock the transmission in a selected gear ratio, that shown in Figure 12 being the high speed gear ratio.

At their apex or upper end, each plate is provided with an upwardly projecting pin, these pins being numbered 184, 186 and 188 respectively in the views of Figures 2 and 12. These latch pins extend through aligned bores in the casing 28 and in the top of the hanger 12 and into the guideway 172 whereby they may be selectively depressed by the projection or lug 178 on the finger 176 as the latter moves towards the right as viewed in Figure 2. Springs 190 are disposed in sockets or recesses 192 in the lower side of the pins 184, 186, and 188 respectively, these pins being also received in appropriately positioned slots in the apex portion of the plates 180 and abutting against a retaining pin 194 which is secured in the partition 62 and in the end plate 32.

The function of these springs is to yieldingly urge the latch plates and their pins into their upper or raised position as shown in Figure 2, but to permit each plate to be successively depressed by the finger 176 as its projection 178 engages one of the pins. In Figure 12 there is shown the position in which the finger depresses the pin 184 and urges this latching plate downwardly for retaining the selector sleeve 50 in the high gear position. It will be understood that each latch plate in turn may be urged into its downward latching position upon successive movement of the finger and its projection in the slots or guide channels 172.

Adjacent their base, the sides of the triangular latch plates 180 are provided with parallel vertical edges 196 terminating in laterally projecting outwardly extending shoulders 198. As shown particularly in Figures 5 and 13, the edges 196 are guidingly and slidingly retained between a pair of guide pins 200, see also Figure 6, which may conveniently be carried by the end wall 32 and/or the partition 62 or mounted in any desired manner. These guide pins together with the sliding engagement of the pins 184, 186 and 188 as they extend through bores in the housing 28 and hanger 12 retain and guide the plates 180 for vertical straight line guided motion, while the shoulders 198 further limit upward travel of the latch plates.

The sleeve 50 immediately below the upper portion of the openings 182 in the latch plates is provided with a circumferentially extending groove or channel into which one of the latch plates may be downwardly depressed, this channel being indicated at 210. When the latch plates are urged downwardly against the resistance of their return springs, and are engaged in this channel in the sleeve, it is obvious that the sleeve will be prevented from shifting to another position and thereby the transmission will be locked in the selected gear ratio. Each latch plate 180 may be engaged in the channel 210 when the selector sleeve 50 has been shifted to register the channel with the selected latch plate thus locking the selector sleeve and the transmission in a selected gear ratio.

*Gear shift synchronizing mechanism*

Figure 18:
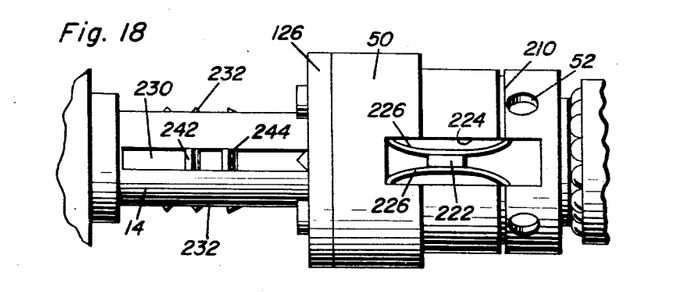
Figure 18 is a fragmentary view in elevation of a portion of the transmission.

Synchronizing means are provided which limit the automatic shifting of the sleeve 50 in order to provide a different gear ratio for the transmission until there is a torque difference of zero between the shaft 14 and the driven elements of the transmission. This synchronizing mechanism is provided to prevent the automatic shifting of the speed ratio as when the bicycle, when travelling either up or down a grade with a heavy driving torque applied by the pedals through the mechanism to the driven members or with a heavy torque reversely applied by the driven elements to the shaft 14. For a consideration of this synchronizing mechanism, attention is now directed primarily to Figures 5, 8, 9, 16 and 18. As shown in Figure 5, the shaft 14 is provided with a diametrical slot 220 therethrough in which is received a diametrically disposed key 222. The opposite ends of this key project into a pair of slots 224 provided in the opposite sides of the sleeve 50. A pair of leaf springs 226, see Figure 18, are provided in these slots, one end of each spring being fixedly secured in any desired manner to the walls of the slot in the member 50, while the other end of the spring engages the same wall of the slot and is slidable thereon. The springs are bowed towards each other at their mid-portion and embrace therebetween the projecting end of the key 222. Thus, the springs tend to resiliently position this key centrally of the slot, but will yield to permit slight relative rotation of the sleeve with respect to the shaft under the influence of torque applied to either member. The purpose of this arrangement whereby the shaft 14 and the sleeve 50 are resiliently urged into a neutral or rotationally indexed position will subsequently be made apparent.

There are provided, attention being now directed to Figures 4, 7–9, 16, 18–26, two pairs of diametrically oppositely disposed resilient leaf spring latch members 230 and 232. The pair of fingers 230 are disposed at 180° rotationally of the shaft from each other, and the fingers 232 are correspondingly disposed, with the set of fingers 232 being positioned at 90° intervals from the fingers 230. Further, these fingers have their operative latch elements longitudinally spaced from each other as shown in full and dotted lines in Figures 8 and 9 for a purpose to be subsequently apparent.

The pair of fingers 230 are longer than the fingers 232, as will be apparent from Figures 23–26 for a purpose to be presently set forth. Each finger consists of a flat leaf spring element lying in a longitudinally extending recess 236 in the exterior surface of the shaft 14, with one end of each finger being rigidly secured to the shaft in the bottom of its recess in any desired manner. The other end of each finger is free to move or flex radially and has a radially or upwardly projecting lug with a tapered or beveled top surface. Between the ends of each spring are a pair of longitudinally spaced upwardly projecting V-shaped ribs. These lugs and ribs cooperate with the flange 84 of the control sleeve 82 and with the retainer ring 126 of the selector sleeve 50 in a manner to be now disclosed.

The fingers 230, 232 have the lugs or end members 238, 239 with their beveled, tapered or cam surfaces 240, 241 and the spaced ribs 242, 244 and 243, 245, respectively.

Although any desired number of the fingers 230 or 232 can be provided with one slot 236 for each finger, two each of each finger is found to be satisfactory.

The retaining ring 126 has its hub provided with radial slots 260 therein, see Figures 8, 9, 16, 19–22, one for each of the fingers 230, 232. These slots are of such dimensions and are so positioned that when the fingers are compressed or flexed into their recesses 236, the lugs 238, 239 will slide through the slots, the beveled surfaces 240, 141 assisting in this operation. However, when the fingers are not flexed into their recesses, the end members or lugs 238, 239 will engage the retaining ring 126 thereby preventing passage of the fingers into or out of these slots. The fingers having inherent resiliency elevating the lugs out of their recesses 236 and blocking such passage until the ribs are actuated to depress the fingers into their recesses.

The circular knife edge 86 of the flange 84 of the control sleeve acts to depress the fingers by engaging their ribs in proper sequence, it being seen as previously explained that the position of the control sleeve 82 is adjusted by the speed responsive actuating mechanism including the leaf springs and the spring 112.

Reference is now made especially to Figures 19–22 in conjunction with Figures 23–26 for an understanding of the automatic operation of this transmission.

Figure 8:
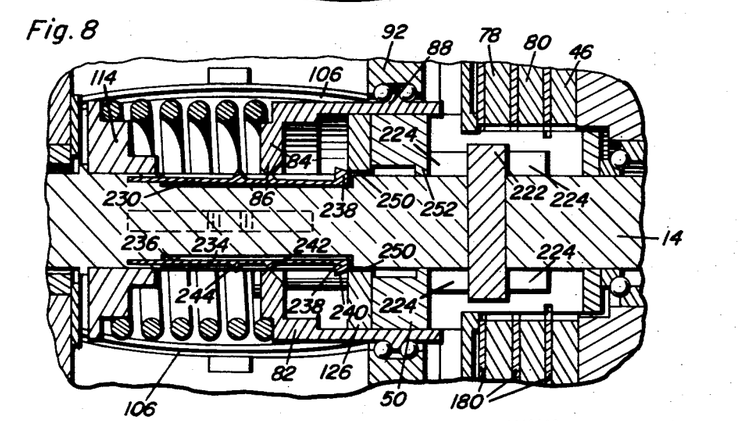
Figures 8–10 are fragmentary detail views taken upon an enlarged scale of a portion of the mechanism shown in Figure 2 and illustrating different positions during the operation of the transmission actuating mechanism.
Figure 9:
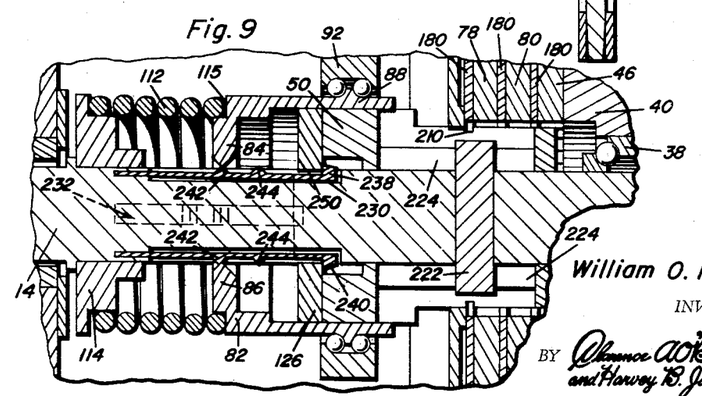
Figure 19:
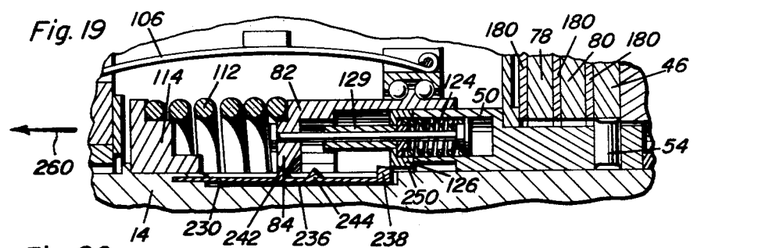
Figures 19–22 are fragmentary views in vertical longitudinal section of a portion of the automatic actuating mechanism of the transmission, showing successive positions of the parts during shifting of the transmission from direct drive to high gear ratio and then reversely shifting down to an intermediate gear ratio; and, Figures 23–26 are diagrammatic views illustrating the relative movements and positions of the resilient latch members for the positions of the mechanism shown in Figures 19–22 respectively.
Figure 20:
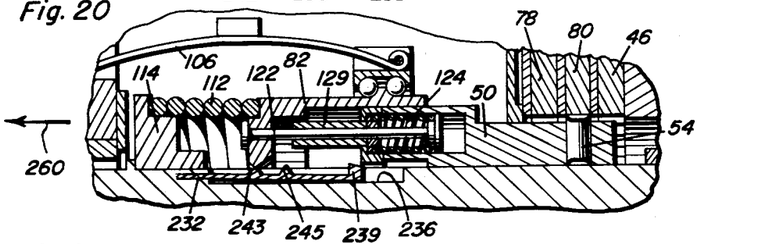
Figure 21:
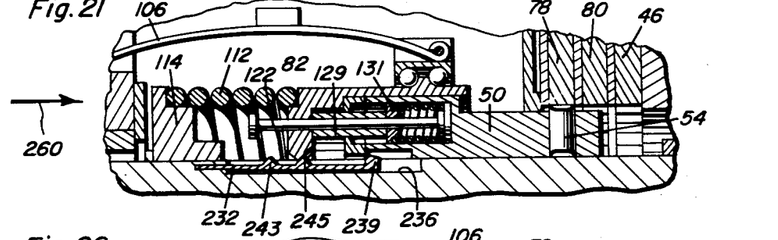
Figure 23:
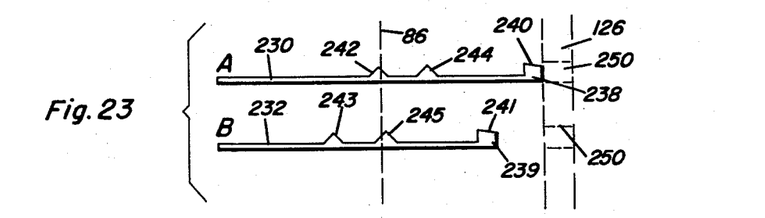

With the transmission at rest, the parts thereof will be positioned as shown in Figures 2 and 8, this being in direct or the low speed drive, with the fingers being in the positions shown in Figure 23. It will be noted that the flange edge 86, see Figures 23 and 19 is engaging the rib 242 depressing finger 230 and the rib 245 of finger 232, depressing their lugs 238, 239 in readiness for passage through the slots 250; while the end of the lug 238 is in abutting engagement with the ring 126 and registers with its slot 250 therein, the lug 239 being spaced from the retaining ring 126. Incidentally, Figures 23–26 show the comparative positions of a finger A of the set of fingers 230 with a finger B of the set of fingers 232, it being understood that the other fingers of the sets 230 and 232 will be in the same respective positions as their fingers A or B.

As the member 96 increases in speed, the centrifugal weights 116 and springs 106 pull the control sleeve 82 towards the left against the resistance of the return spring 112. This causes the rods 122 to "cock" or compress the springs 124 as shown in Figure 19. This would result in the movement of the selector sleeve 50 towards the left, shifting the transmission into a higher gear ratio. Such shifting is blocked or prevented by the lugs 238, 239 until such time as the lugs are retracted into their recesses by the action of the control sleeve edge 86 upon the finger ribs and until the slots 250 in the control sleeve register with the lugs 238, 239, which last condition occurs when the selector sleeve 50 is centered upon the shaft 14 through the springs 224 and lugs 222, this occurring as previously mentioned when the torque between the crankshaft 14 and the sprocket 18 is zero. In other words, either when power is applied to the crankshaft 14 by the pedals or when the sprocket gear tends to drive the shaft or to drag upon the shaft as when the coaster brake is applied, the lugs 222 overcome their centering springs 224 and cause a slight rotation of the selector sleeve 50 on the shaft 14 preventing registry of the slots 250 with the lugs 238, 239.

Figure 24:
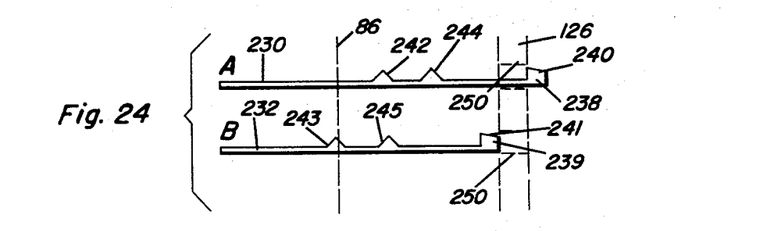

Figure 19 shows the position of the transmission shifting mechanism with the springs 124 "cocked" in readiness to shift the selector sleeves to place the transmission in an intermediate gear ratio. When the torque becomes zero, the springs 124 move the selector sleeve 50 to the left, sliding the clutch pins 54 in their slots 58 from the direct drive gear 46 (Figures 2 and 19) and into engagement with the intermediate gear 80 (Figure 20), the lug 238 on finger A passing through its aligned slot 250 as shown in Figure 24 and with the lug 239 on the finger B abutting the wall of the ring 126 and blocking further travel of the selector sleeve.

When the speed of the member 96 increases further, the control sleeve is again moved further to the left again compressing or "cocking" the springs 124 and the flange edge 86 depresses the rib 243 of the fingers 232 thereby retracting the blocking lugs 239. This is the position shown in Figure 20. Consequently, when the torque difference between the shaft 14 and the sleeve 50 is again zero, the selector sleeve 50 is again moved to the left, moving the clutch pins 54 into engagement with the high speed gear 78 as shown in Figure 12. The lug 239 engages the ring 126 holding the transmission in high gear shown in Figure 21.

The reverse shifting of the transmission is illustrated in Figures 21, 22, 25 and 26. As the speed drops, the control sleeve moves to the right, the sleeve 129 compressing the spring 124 and the flange edge 86 engaging and depressing rib 245 of finger 232 and retracting the lug 239 so that when the torque of the shaft 14 and of the sprocket gear are zero, the lugs 239 will pass through their slots 250 and allow the selector sleeve to shift the clutch pins 54 into engagement with the intermediate gear 80 as in Figure 22, this position being shown in Figure 25. In this position the lug 238 engages the ring 126, see Figure 26, preventing further shifting.

Figure 22:
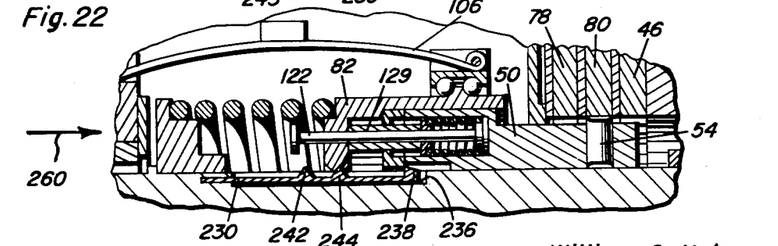
Figure 26:
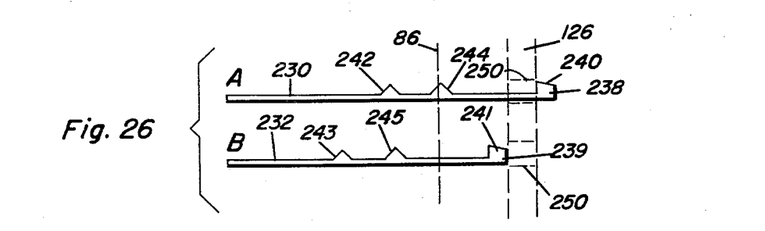

Upon further speed reduction, the control shifts further to the right again compressing the springs 124 by the sleevese 129 as in Figures 22 and 26. When the flange edge 86 depresses the rib 244, the lug 238 is depressed and passes through its slot 250 as the selector sleeve 50 now shifts the transmission again into direct drive.

Figure 25:
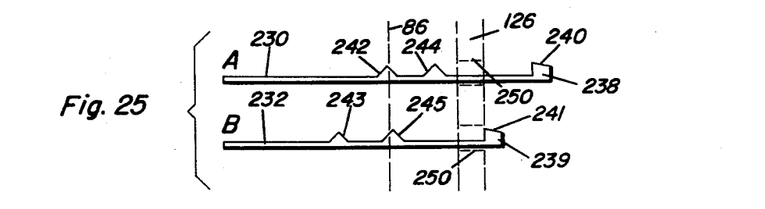

It will thus be observed that the ribs 242, 243 control the shifting from direct to intermediate and then to high gear, while the ribs 245 and 244 control the shifting from high gear to intermediate and direct drive, which the lugs 238 and 239 constitute stops engaging the outer side of the control sleeve flange 84 to stop the control sleeve in the different gear positions during upshifting as in Figures 23, 24 while they engage the inner sides of their flange as stops during downshifting as in Figures 25, 26.

The arrow 260 in Figures 19–22 indicates the direction in which the control sleeve 82 is moving in these figures.

The top surfaces 240, 241 of the lugs 238, 239 are tapered or beveled to facilitate their insertion into the slots 250. As the lugs 238, 239 enter the slots 250 they will be further depressed, so that when they pass through and emerge from the slots, they will spring up, causing them to latch behind the member 126, as in Figure 9. In a similar manner the lugs may have their side walls tapered in order to facilitate their registration with and their entry into the slots 250 as the selector sleeve 50 is moved into its neutral or zero torque position by the springs 224 and the pin 222.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An automatic variable speed transmission comprising a casing, driving and driven members journaled in said casing, gearing assemblies in said casing connected to said driven member, a selector sleeve slidably mounted upon said driving member, clutch pins carried by said selector sleeve having a sliding engagement with said driving member and selective engagement with each of said gearing assemblies, speed responsive means effecting sliding movement of said selector sleeve, means including said clutch pins connecting said selector sleeve and said driving member to prevent rotation therebetween.

2. The combination of claim 1 including manually operable latch means carried by said casing and engageable with said selector sleeve and locking the transmission in selected gear ratios.

3. The combination of claim 1 including synchronizing means connected to said selector sleeve and driving member and preventing sliding movement of said sleeve when there is a torque difference between said driving and driven members.

4. The combination of claim 1 including manually operated means carried by said driving member and connected to said speed responsive means and extending exteriorly of said casing for adjusting the speed ranges of said transmission.

5. The combination of claim 1 wherein said speed responsive means includes a control sleeve slidably mounted upon said selective sleeve, resilient actuating means connected to both of said sleeves for effecting shifting of said selector sleeve upon sliding movement of said control sleeve.

6. The combination of claim 1 wherein said speed responsive means includes a control sleeve slidably mounted upon said selective sleeve, resilient actuating means connected to both of said sleeves for effecting shifting of said selector sleeve upon sliding movement of said control sleeve, a speed responsive mechanism connected to said control sleeve and to said driving member and causing sliding movement of the former in response to variations in the speed of the latter.

7. The combination of claim 1 wherein said speed responsive means includes a control sleeve slidably mounted upon said selective sleeve, resilient actuating means connected to both of said sleeves for effecting shifting of said selector sleeve upon sliding movement of said control sleeve, resilient latch fingers mounted on said driving shaft and engaging said selector sleeve to movably prevent shifting of the latter, said control sleeve having an actuating means selectively engaging said latch fingers for releasing the latter from said selector sleeve whereby the latter may be operated by said control sleeve.

8. The combination of claim 7 wherein said driven shaft has longitudinal recesses therein receiving said latch fingers and providing clearance for the latter when they are operated by said actuating means.

9. The combination of claim 8 wherein said latch fingers have longitudinally spaced lugs thereon each operable to retain said selector sleeve in a longitudinally adjusted position corresponding each to a particular speed.

10. The combination of claim 1 including manually operated means carried by said driving member and connected to said speed responsive means and extending exteriorly of said casing for adjusting the speed ranges of said transmission, said manually operated means comprising a spring having one end operatively connected to said selector sleeve and having its other end operatively connected to a retaining plate whereby movement of said retainer plate will adjust the force of the spring, an adjusting rod for controllably positioning said plate.

11. The combination of claim 10 wherein said adjusting rod is engaged in a bore in said shaft, a slot in said shaft intersecting said bore, a pin on said retainer plate extending through said slot and connected to said rod.

12. The combination of claim 1 including manually operable latch means carried by said casing and engageable with said selector sleeve and locking the transmission in selected gear ratios, said latch means including a latch groove in said selector sleeve, a plurality of latch plates slidably mounted in said casing and each engageable with said latch groove in different positions of said selector sleeve whereby to retain the latter in said different positions of adjustment.

13. The combination of claim 12 wherein said latch plates have apertures therethrough loosely receiving said selector sleeve therethrough, the edge of said apertures being receivable in latching engagement in said latch groove.

14. The combination of claim 1 wherein each of said gearing assemblies includes a ring gear rotatably journaled upon said selector sleeve and having clutch recesses upon its inner periphery receiving said clutch pins when the latter are in alignment therewith upon axial adjustment of said selector sleeve, said shaft having longitudinally extending circumferentially spaced alternate cams and followers for effecting engagement and release of said clutch pins for said ring gear recesses.

References Cited in the file of this patent

UNITED STATES PATENTS

| | | |
|---|---|---|
| 1,427,961 | Long | Sept. 5, 1922 |
| 1,446,205 | Oddie | Feb. 20, 1923 |
| 1,502,953 | Hoffman | July 29, 1924 |
| 1,539,188 | Hoffman | May 26, 1925 |
| 2,592,982 | Violet | Apr. 15, 1952 |